(12) United States Patent
Chatterjee et al.

(10) Patent No.: US 8,271,757 B1
(45) Date of Patent: Sep. 18, 2012

(54) CONTAINER SPACE MANAGEMENT IN A DATA STORAGE SYSTEM

(75) Inventors: Paresh Chatterjee, Fremont, CA (US); Sharon Enoch, Newark, CA (US); Ajit Narayanan, Chennai (IN); Jomy Maliakal, Newark, CA (US)

(73) Assignee: American Megatrends, Inc., Norcross, GA (US)

( * ) Notice: Subject to any disclaimer, the term of this patent is extended or adjusted under 35 U.S.C. 154(b) by 525 days.

(21) Appl. No.: 12/104,135

(22) Filed: Apr. 16, 2008

Related U.S. Application Data

(60) Provisional application No. 60/923,934, filed on Apr. 17, 2007.

(51) Int. Cl.
*G06F 12/00* (2006.01)
*G06F 13/00* (2006.01)
*G06F 13/28* (2006.01)

(52) U.S. Cl. ........................... 711/165; 711/114

(58) Field of Classification Search .................. 711/114, 711/165
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,502,836 A * | 3/1996 | Hale et al. .................. | 711/170 |
| 5,720,027 A | 2/1998 | Sarkozy et al. | |
| 5,732,238 A | 3/1998 | Sarkozy | |
| 5,787,459 A | 7/1998 | Stallmo et al. | |
| 5,790,774 A | 8/1998 | Sarkozy | |
| 5,893,919 A | 4/1999 | Sarkozy et al. | |
| 5,974,426 A | 10/1999 | Lee et al. | |
| 6,098,128 A | 8/2000 | Velez-McCaskey et al. | |
| 6,275,898 B1 | 8/2001 | DeKoning | |
| 6,327,638 B1 | 12/2001 | Kirby | |
| 6,484,235 B1 | 11/2002 | Horst et al. | |
| 6,718,436 B2 | 4/2004 | Kim et al. | |
| 6,785,678 B2 | 8/2004 | Price | |
| 6,901,479 B2 | 5/2005 | Tomita | |
| 7,360,051 B2 | 4/2008 | Sugino et al. | |
| 7,404,102 B2 | 7/2008 | Soran et al. | |
| 7,536,529 B1 | 5/2009 | Chatterjee et al. | |
| 7,562,200 B1 | 7/2009 | Chatterjee et al. | |

(Continued)

OTHER PUBLICATIONS

U.S. Official Action dated Mar. 30, 2009 in U.S. Appl. No. 11/417,801.

(Continued)

*Primary Examiner* — Jared Rutz
*Assistant Examiner* — Ryan Bertram
(74) *Attorney, Agent, or Firm* — McKeon, Meunier, Carlin & Curfman, LLC

(57) ABSTRACT

Technologies are described for implementing container space management (CSM) in a data storage system. Performance may be improved by ensuring that the maximum number of drive spindles is made available to I/O loads. This may be accomplished by distributing data equally amongst all drive spindles, even if the drive spindles are in different logical drives. A workflow analysis may be performed to determine when the I/O load on the storage system is low and thus identify preferred times for background data re-striping. Data may be re-striped in a minimum number of movements using a data placement algorithm and data placement maps to select data to be re-striped. The data may be re-striped such that the most frequently accessed data within a tier is moved first. Such re-striping can be performed in a manner which optimizes the performance of the storage system both during, and after, the re-striping process.

14 Claims, 8 Drawing Sheets

U.S. PATENT DOCUMENTS

| | | | |
|---|---|---|---|
| 7,730,531 | B2 | 6/2010 | Walsh |
| 2002/0083036 | A1 | 6/2002 | Price |
| 2002/0091746 | A1 | 7/2002 | Umberger et al. |
| 2002/0161983 | A1 | 10/2002 | Milos et al. |
| 2003/0163630 | A1 | 8/2003 | Aasheim et al. |
| 2005/0055402 | A1* | 3/2005 | Sato .............................. 709/205 |
| 2005/0165925 | A1 | 7/2005 | Dan et al. |
| 2005/0188075 | A1 | 8/2005 | Dias et al. |
| 2006/0031648 | A1 | 2/2006 | Ishikawa et al. |
| 2006/0031649 | A1 | 2/2006 | Murotani et al. |
| 2006/0107013 | A1* | 5/2006 | Ripberger ..................... 711/170 |
| 2006/0130042 | A1 | 6/2006 | Dias et al. |
| 2006/0243056 | A1 | 11/2006 | Sundermeyer et al. |
| 2006/0248273 | A1* | 11/2006 | Jernigan et al. ............... 711/114 |
| 2007/0283348 | A1 | 12/2007 | White |
| 2008/0104343 | A1 | 5/2008 | Miyagaki et al. |
| 2008/0320247 | A1 | 12/2008 | Morfey et al. |
| 2009/0037679 | A1 | 2/2009 | Kaushik et al. |

OTHER PUBLICATIONS

U.S. Official Action dated Jul. 8, 2009 in U.S. Appl. No. 11/417,801.

U.S. Appl. No. 12/425,123, filed Apr. 16, 2009 entitled "Provisioning Space in a Data Storage System", Inventors: Chatterjee et al.

U.S. Appl. No. 11/417,801, filed May 4, 2006, entitled "Method, System, and Apparatus for Expanding Storage Capacity in a Data Storage System", Inventors: Chatterjee et al.

U.S. Appl. No. 11/254,347, filed Oct. 20, 2005, entitled "Method, System, Apparatus, and Computer-Readable Medium for Provisioning Space in a Data Storage System," Inventors: Chatterjee et al.

U.S. Official Action dated Sep. 4, 2007 in U.S. Appl. No. 11/254,347.

U.S. Official Action dated Mar. 18, 2008 in U.S. Appl. No. 11/254,347.

U.S. Appl. No. 12/101,236, filed Apr. 11, 2008, entitled "Data Migration Between Multiple Tiers in a Storage System Using Age and Frequency Statistics," Inventors: Chatterjee et al.

U.S. Appl. No. 12/101,238, filed Apr. 11, 2008, entitled "Data Migration Between Multiple Tiers in a Storage System Using Pivot Tables," Inventors: Chatterjee et al.

U.S. Appl. No. 12/101,241, filed Apr. 11, 2008, entitled "Allocating Background Workflows in a Data Storage System Using Autocorrelation," Inventors: Chatterjee et al.

U.S. Appl. No. 12/101,251, filed Apr. 11, 2008, entitled "Allocating Background Workflows in a Data Storage System Using Historical Data," Inventors: Chatterjee et al.

U.S. Official Action dated Oct. 8, 2008 in U.S. Appl. No. 11/254,347.

U.S. Notice of Allowance / Allowability dated Jan. 12, 2009 in U.S. Appl. No. 11/254,347.

U.S. Official Action dated Nov. 5, 2010 in U.S. Appl. No. 12/101,238.

U.S. Official Action dated Jan. 21, 2011 in U.S. Appl. No. 12/101,241.

Burtscher, Martin et al., "Prediction Outcome History-based Confidence Estimation for Load Value Prediction," Department of Computer Science, University of Colorado, Journal of Instruction-Level Parallelism 1, May 1999, pp. 1-25.

U.S. Official Action dated Dec. 2, 2010 in U.S. Appl. No. 12/104,123.

U.S. Official Action dated Dec. 22, 2010 in U.S. Appl. No. 12/101,236.

U.S. Official Action dated Jan. 21, 2011 in U.S. Appl. No. 12/857,050.

U.S. Official Action dated Mar. 7, 2011 in U.S. Appl. No. 12/013,124.

* cited by examiner

CONTAINER SPACE MANAGEMENT IN A DATA STORAGE SYSTEM

CROSS-REFERENCE TO RELATED APPLICATIONS

This application claims the benefit of U.S. provisional patent application No. 60/923,934, filed on Apr. 17, 2007, and entitled "Container Space Management" which is expressly incorporated herein by reference in its entirety.

BACKGROUND

A virtualized cluster is a cluster of different storage nodes that together expose a single storage device. Input/output (I/O) operations sent to the cluster are internally re-routed to read and write data to the appropriate locations. In this regard, a virtualized cluster of storage nodes can be considered analogous to a collection of disks in a Redundant Array of Inexpensive Disks (RAID) configuration, since a virtualized cluster hides the internal details of the cluster's operation from initiators and presents a unified device instead.

A virtualized cluster can be structured as one or more containers, where a container is a group of logical drives operating together. Each logical drive can be a group of disks that form a RAID. Within a container, a combination of less expensive, slower drives and more expensive, faster drives is often used together to achieve a desired mix of performance and price. Such a homogeneous container consists, therefore, of a plurality of sets of logical disks, each set having different cost and performance parameters. These sets can be referred to as the tiers of the container. That is, the set of logical drives within a container may be partitioned into tiers and a given tier may include multiple logical drives.

As additional drives are added to a storage system, the new drives can be used to expand an existing RAID or a new RAID can form a new logical drive which can then be added to a tier of the container. Generally, the approach of forming a new logic drive is used to avoid the generally lengthy re-striping that occurs when a RAID is expanded. However, the addition of a new logical drive to a container still requires data to be migrated into the new logical drive.

Another reason for adding a new logical drive to a container is the due to RAID controller designs that limit the number of disks that can be added to one logical drive. Also, some RAID cards may have restrictions on creating arrays across multiple enclosures. If a storage system contains multiple enclosures or Just a Bunch of Disk (JBOD) arrays, it may become necessary to have independent logical drives for each RAID, enclosure, or JBOD array.

Yet another reason for multiple logical drives within a tier of a container is due to a substantial spread in speeds and cost of physical drives available. It is conceivable that different logical drives may have different RAID levels but may still fall in the same tier. For example, a RAID-10 array with 7500 RPM SATA drives and a RAID-50 array with 10000 RPM SATA drives may be allocated to a common tier within a container.

Whatever the reason for having multiple logical drives within a single tier, stored data must be allocated within the tier by efficiently dividing the data between the logical drives within the tier. Determining how the data stored in the container should best be distributed among the various logical drives of each container tier presents an interesting challenge.

It is with respect to these considerations and others that the disclosure made herein is presented.

SUMMARY

Technologies are described herein for implementing container space management (CSM) in a data storage system. CSM can take advantage of the notion that the number of drive spindles available for storing data can be directly proportional to the performance of a storage system. Thus, the performance of a system containing multiple logical drives may be improved by ensuring that the maximum number of spindles is made available to I/O loads. This may be accomplished by distributing data equally amongst all drive spindles, even if the drive spindles are in different logical drives. CSM may also minimize the duration of data migration to re-stripe the data. The re-striping can be performed in a manner which optimizes the performance of the storage system both during, and after, the re-striping process.

According to one embodiment, CSM may determine how often data is re-striped. For example, data may be re-striped whenever an existing container is expanded with a new logical drive. Also, data re-striping may occur at some fixed interval, for example every hour. At this re-striping interval, an analysis of the data present in each container of the system may be performed before re-striping begins.

According to another embodiment, CSM may determine when data should be re-striped. For example, a workflow analysis may be performed to determine when the I/O load on the storage system is low. Such a time may be best for data re-striping in order to minimize impact on the storage bandwidth available to users and/or applications.

According to yet another embodiment, CSM may determine how data should be re-striped. For example, the data may be re-striped in a manner that distributes the data equally across the logical drives of a tier with a minimum number of movements. A data placement algorithm may use data placement maps to determine which data should be re-striped. CSM may use a granularity size of a territory to re-striped data. For example, a territory may be 8 MB in size.

Furthermore, CSM may determine an ordering for the re-striping of data. For example, data may be re-striped such that the most frequently accessed data within the tier is moved first. Thus, the most frequently accessed data, once re-striped, may be quickly provided the performance improvement from the addition of drive spindles. Providing this performance improvement as early as possible may increase the positive impact of the container expansion on system performance.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
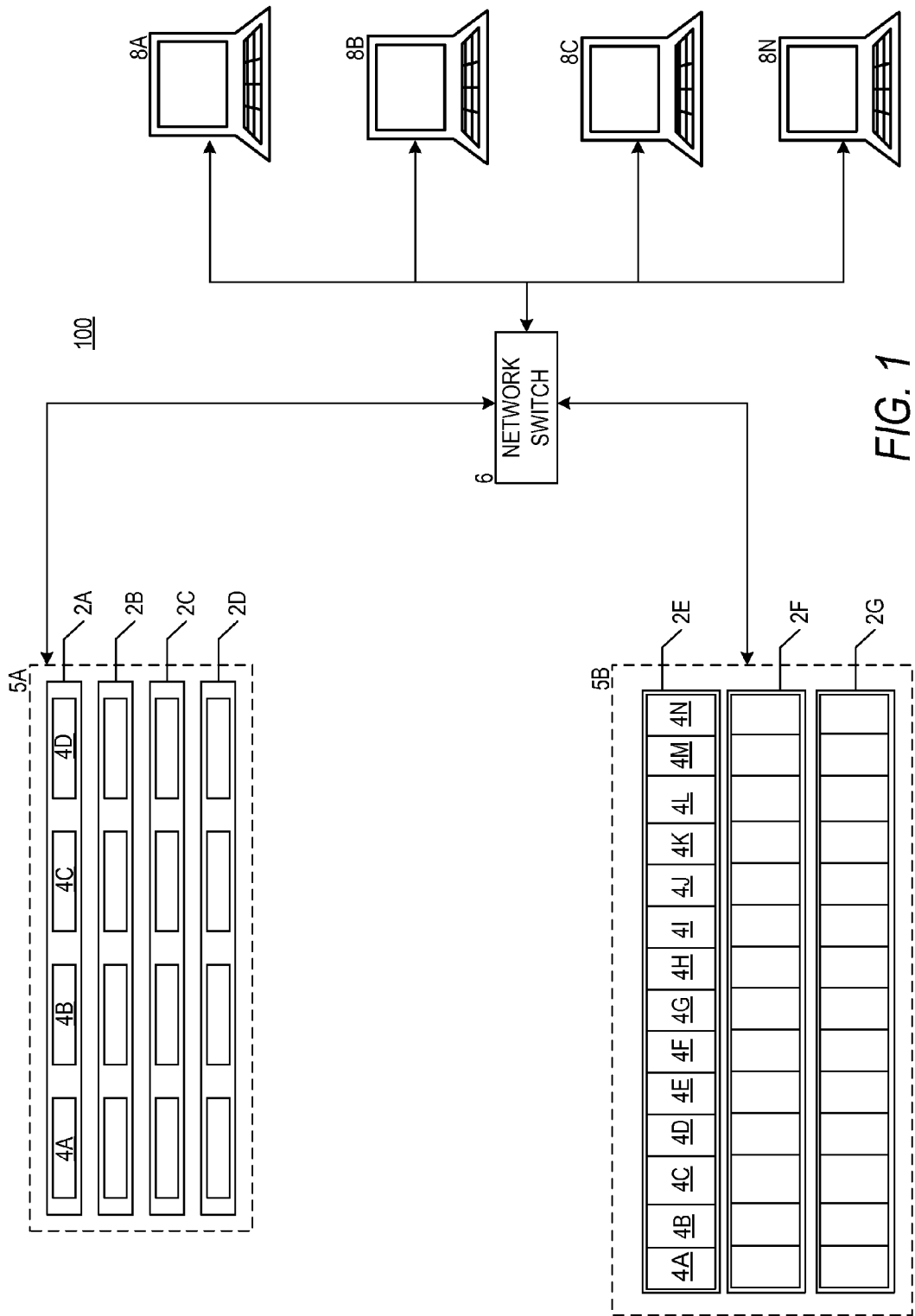
FIG. 1 is a network architecture diagram illustrating aspects of a storage system that includes several virtualized clusters according to one exemplary embodiment.

The following detailed description is directed to implementing container space management in a data storage system. Through the use of the embodiments presented herein, data can be re-striped within a tier of a container. Such re-striping may be required when a new logical drive is added to the container and has performance and cost characteristics consistent with the given tier of the container.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for implementing container space management within a data storage system will be described.

Turning now to FIG. 1, details will be provided regarding an illustrative operating environment for the implementations presented herein, as well as aspects of several software components that provide the functionality described herein for implementing data migration in a multitier storage system using age and frequency statistics. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
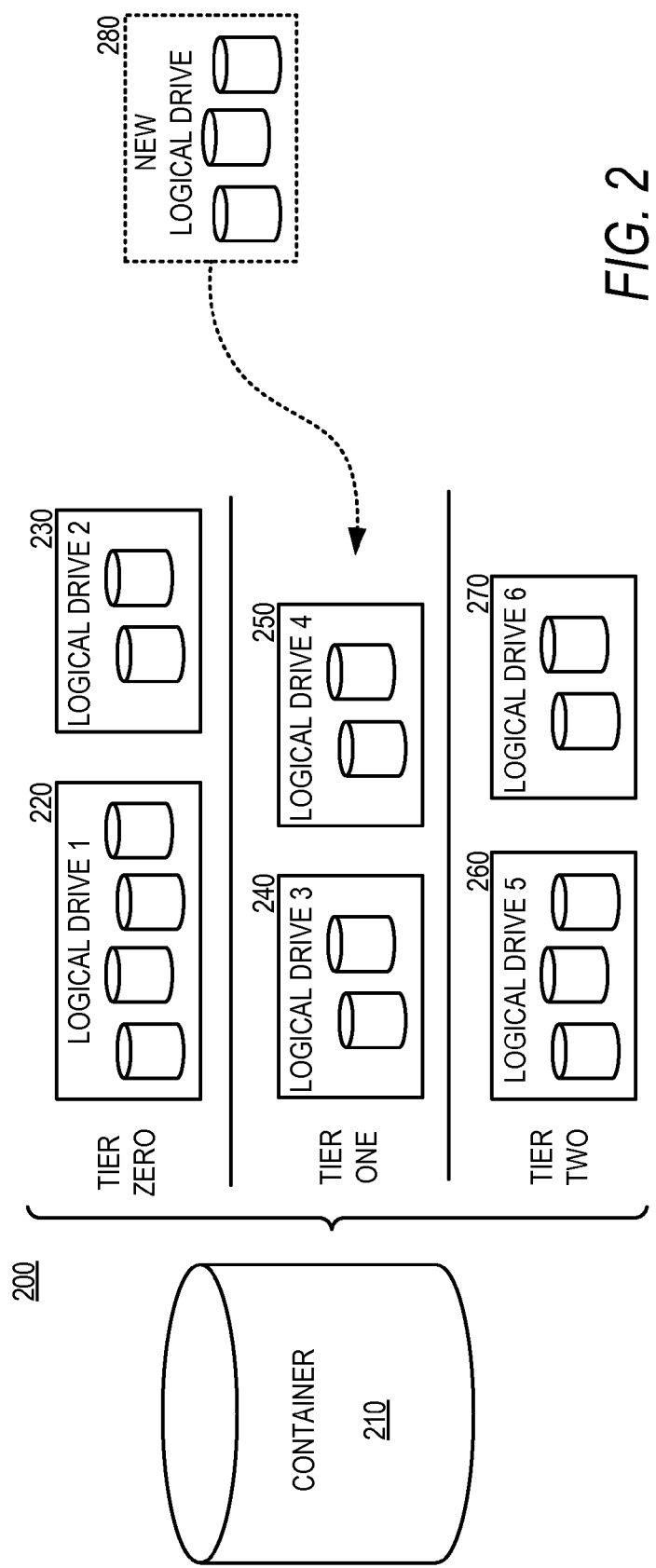
FIG. 2 is a block diagram illustrating the expansion of a storage container through the addition of a new logical drive according to one exemplary embodiment.

Referring now to FIG. 2, a block diagram 200 illustrates the expansion of a storage container 210 through the addition of a new logical drive 280 according to one exemplary embodiment. The container 210 may be a group of logical drives 220-270 operating together. Each logical drive 220-270 can be a group of disks 4 that form a RAID. Within the container 210, the logical drives 220-270 can be partitioned into tiers. This partitioning may be based on the relative cost or performance characteristics of the logical drives. For example, tier zero may include very fast disks 4 with high performance RAID controllers, and high bandwidth network connectivity. In contrast, tier two may include slower disks 4, lower performance RAID controllers, or less network bandwidth. In the illustrated example, tier zero may include two logical drives. Tier zero may include logical drive one 220 having four disks 4 or four spindles as well as logical drive two having two disks 4. Tier one may include both logical drive three 240 having two disks 4 as well as logical drive four 250 having two disks 4. Tier two may include both logical drive five 260 having three disks 4 as well as logical drive six having two disks 4.

As three additional disks 4 are added to a storage system, the new disks 4 may be formed into new logical drive 280. The new logical drive 280 can then be added to the container 210. First, the tier within the container will have to be determined for the new logical drive 280. Again, this determination can be based on the cost and performance parameters of the drive 280. In the illustrated example, the new logical drive 280 has been determined to belong to tier one of the container 210. As such, the new logical drive 280 may have similar cost and performance characteristics as logical drive three 240 and logical drive four 250. After the addition of the new logical drive 280, data must be re-striped within the tier onto the new logical drive 280. For example, territories of data may be migrated from both logical drive three 240 and logical drive four 250 onto the new logical drive 280 in order to equalize the distribution of data amongst the logical drives of tier one within the container 210.

Figure 3:
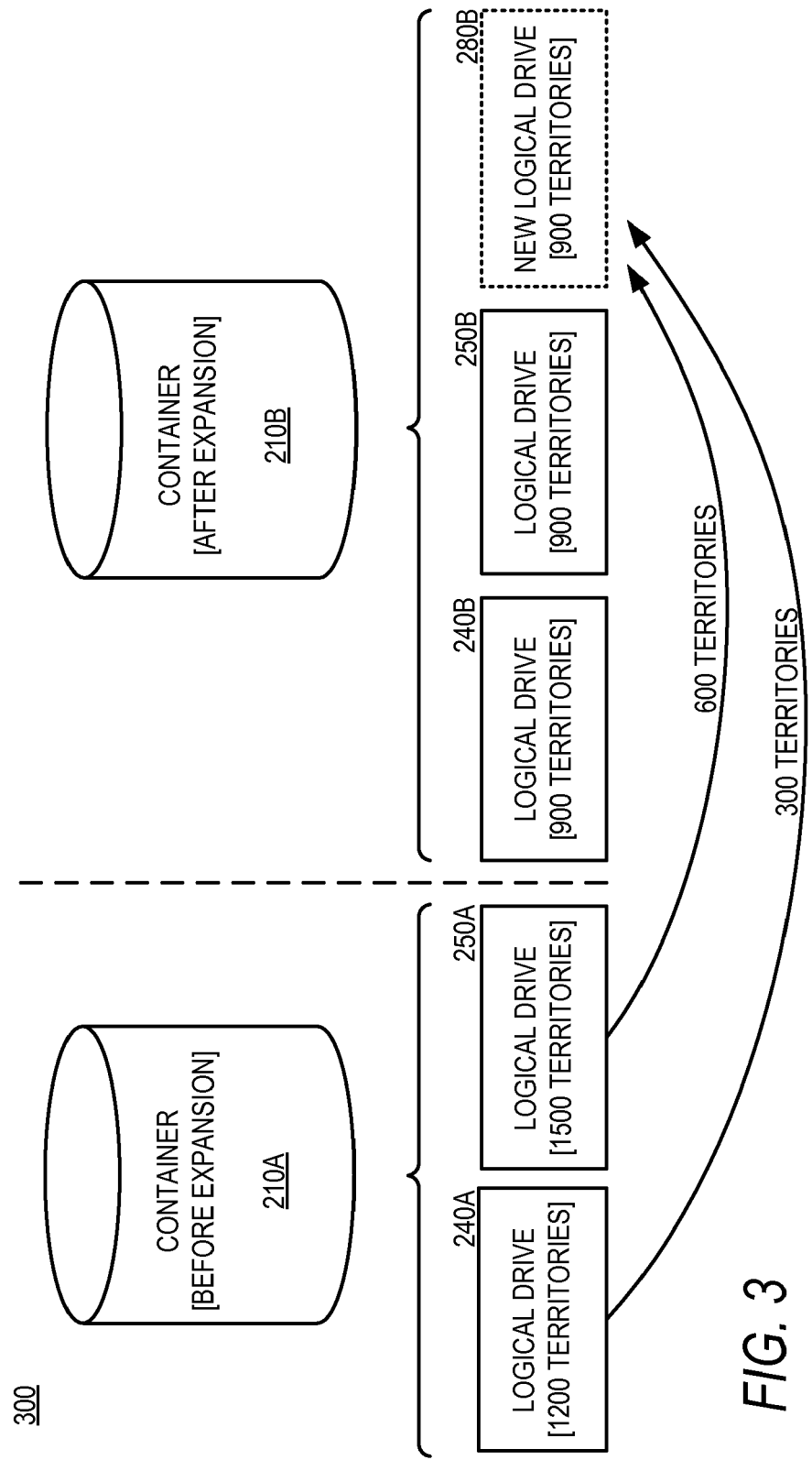
FIG. 3 is a block diagram illustrating the migration of data within a newly expanded storage container according to one exemplary embodiment.

Referring now to FIG. 3, a block diagram 300 illustrates the migration of data within a newly expanded storage container 210B according to one exemplary embodiment. The expansion of the container 210A can be carried out by adding a new logical drive 280B to tier one of the container 210A forming an expanded container 210B. Tier one of the original container 210A may include both logical drive 240A having 1200 territories and logical drive 250A having 1500 territories. The expanded container 210B can also include the new logical drive 280B. After re-striping, all three logical drives within tier one of the newly expanded container 210B can be equalized to have 900 territories each.

The territories allocated in the tier can be verified to be equally striped across the different logical drives of the same tier. When there is an imbalance in the striping of the data across the logical drives of the same tier, re-striping can begin. A workflow module can provide a data migration quota, or a maximum number of territories that may be migrated. This quota can be calculated based on a predicted I/O load to minimize impact on the servicing of I/Os from users or other application. This quota may be considered, as a ceiling, when determining how many territories to migrate between the logical drives of a tier.

While it can be a goal to equalize the data between the logical drives such that each logical drive contains approximately the mean number of territories of all of the logical drives within the tier, the target for each logical drive may also be weighted by its storage capacity or even by its number of spindles, or disk drives. Allowing a larger logical drive to store more data than a smaller logical drive may prevent a waste of storage capacity. This loosened definition of mean as either the strict mean or a mean weighted by capacity or number of spindles may be applied to any use of mean, average, or μ, throughout this disclosure.

Figure 4:
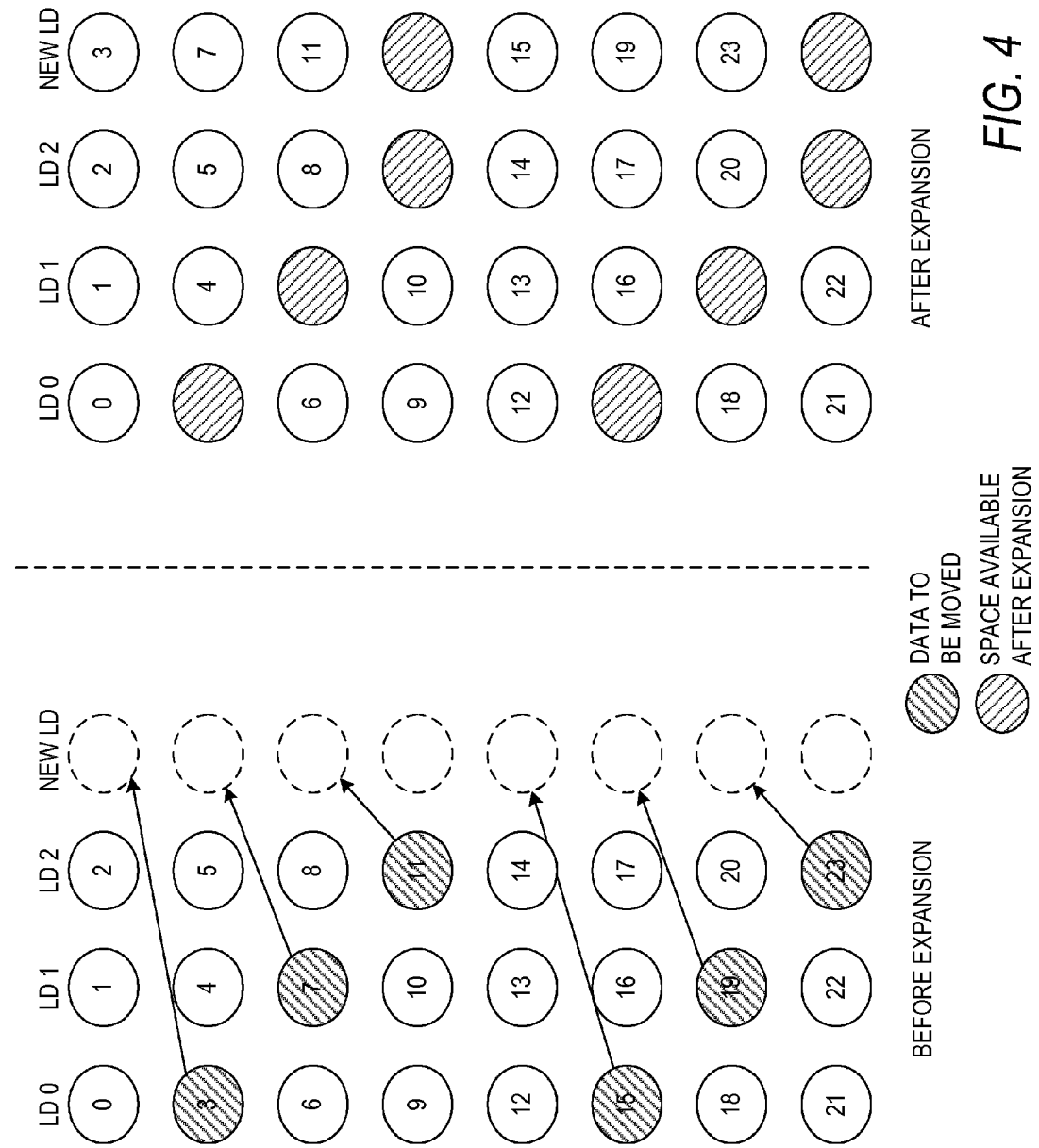
FIG. 4 is a data diagram illustrating a migration of data from a tier with three logical drives to a fourth new logical drive using data placement maps according to one exemplary embodiment.

Referring now to FIG. 4, a data diagram 400 illustrates the migration of data from a tier with three logical drives to a fourth new logical drive using data placement maps according to one exemplary embodiment. A data placement algorithm (DPA) may provide guidelines by which territories can be migrated from the existing logical drives to the new logical drive during post-expansion re-striping. When a new logical drive 280 is added to a container 210, data can be migrated to the new logical drive 280 in a manner that ensures that a minimum amount of data is moved. Additionally, the capacity of the newly added logical drive 280 can be made available to data I/O operations immediately. During the data migration process, only small areas, or territories, may need to be locked. Minimizing the amount of data locked at one time may improve the availability of the container 210 during the migration process.

FIG. 4 illustrates the re-striping of data stored on a three logical drive tier to a four logical drive tier. The arrows in FIG. 4 illustrate the territories that need to be moved as a result of the addition of a new logical drive to the three existing logical drives of the tier. It should be appreciated that the process of re-striping data may involve moving a preferably equal amount of data from each of the logical drives zero, one, and two into the new logical drive. There may be no movement of data required amongst the three logical drives that were in the container tier prior to expansion.

A benefit of the DPA method of arranging data is that the additional I/O load on the existing logical drives may be reduced, even for the territories that are being transferred. First, the migrating territories are only read from the original logical drives. All migration writes take place only on the newly added logical drive. Since the same disks may not incur both read and write operations, the increased latency that may be experienced with traditional data re-striping can be avoided. Since the original logical drives contain a majority of data in the cluster, moving data first to the new logical drive can ensure that the busiest drives are loaded as lightly as possible by the expansion process. This can improve overall storage system performance.

Data placement maps used while implementing DPA may be generated and stored within the data storage system. These maps may define a stripe pattern for storing data within the storage system. Each map can correspond to a container 210 or tier having a certain number of logical drives. For instance, unique maps may be generated and stored for container tiers having three nodes, four nodes, five nodes, and so on. An appropriate map can be selected based on the number of nodes in the container tier. Data within the container tier may then be striped, or re-striped according to the selected map.

When a new logical drive is added to a container, a data placement map may be selected based on the configuration of the container tier after the new logical drive has been added. The data stored in the tier can then be re-striped across all of the logical drives, including the newly added logical drive, according to the selected map. The stripe pattern for each map may be defined such that when a logical drive is added to a container and the data is re-striped according to the map, only the data that will subsequently reside in the new logical drive is moved to the new logical drive during re-striping. The stripe pattern may be further defined so that during re-striping no movement of data occurs between previously existing logical drives. Additionally, the stripe pattern may be defined such that an equal amount of data is moved from each of the existing logical drives to the new logical drive during re-striping.

Figure 5:
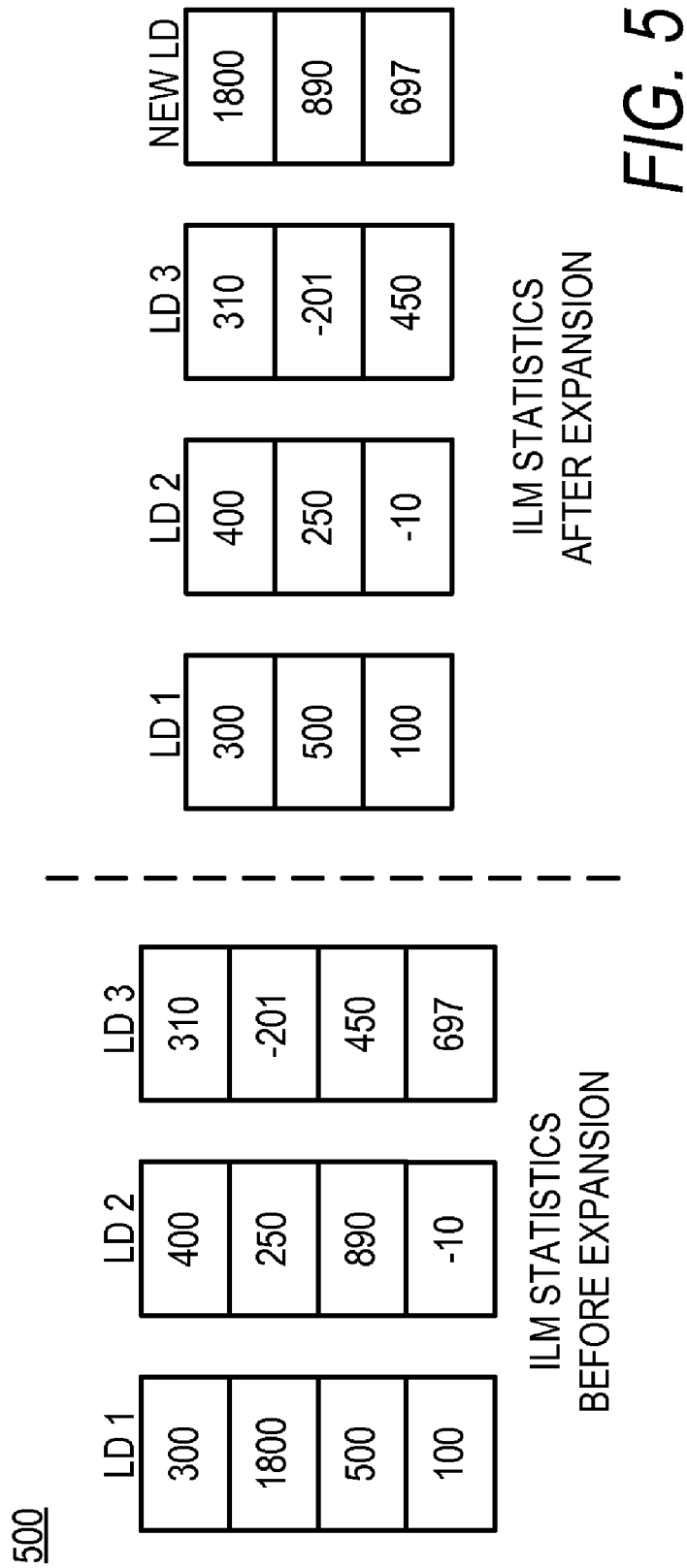
FIG. 5 is a data diagram illustrating the migration of data using information lifecycle management statistics according to one exemplary embodiment.

Referring now to FIG. 5, a data diagram 500 illustrates the migration of data using information lifecycle management (ILM) statistics according to one exemplary embodiment. In the example, the territory with the highest ILM statistics value in each of the existing logical drives can be migrated to the new logical drive first. While the DPA, as discussed with respect to FIG. 4 may be used to determine which territories to migrate where, ILM statistics may be used to determine a preferred ordering for migrating the territories. When a new logical drive is added to a tier of a container, the most frequently accessed territories may be migrated to the new logical drive first. This can ensure that data that is most likely to be accessed again in the near future is placed on the new logical drive thus quickly increasing access to the new logical drive while reducing some of the heaviest load generating territories on the existing logical drives. This can balance the access between the drive spindles, including those of the newly added logical drive, thus taking advantage of the performance improvements that may be provided by the use of additional spindles.

To determine how frequently a territory is accessed, a frequency statistic can be maintained. If a territory was accessed during a most recent update period, the frequency statistic can be incremented each time the territory is accessed. At the end of an update period, the frequency statistic can represent the number of accesses during that update period. A second ILM statistic may be an age statistic. If a territory was not accessed during the last update period, the age statistic may be incremented to indicate that is has been a longer time since the territory was accessed. The update period may be any consistent amount of time. The update period may be established by a counter, clock, timer, timer interrupt, or any other time keeping mechanism. Such a mechanism can cause a process, module, or thread to update all of the ILM statistics once per update period. An example of an update period may be one hour, but other time durations can equally be used.

A combined single variable can be used as an ILM metric which can represent both the frequency statistic and the age statistic within one value. The frequency statistic and the age statistic may be considered mutually exclusive since the frequency statistic may be irrelevant for a territory with a higher age, and the age statistic may be taken as zero, or nearly zero, for a frequently accessed territory. Thus only one of the frequency or the age needs to be stored for a given territory. The sign bit, or the most significant bit, of the ILM metric value may be used to indicate whether the ILM metric is currently an age or a frequency. The ILM metric value can represent a signed value, which can be negative when it represents an age, and positive when it represents a frequency. A larger positive number can imply a higher frequency of access than a lower positive number, while a lower (or more negative) negative number can imply an older age than a smaller negative number, thus a consistent continuum across the positive and negative ILM metric values can represent a consistent ordering. This ordering can map to both the most recently and most frequently accessed territories having higher ILM metric values.

Figure 6:
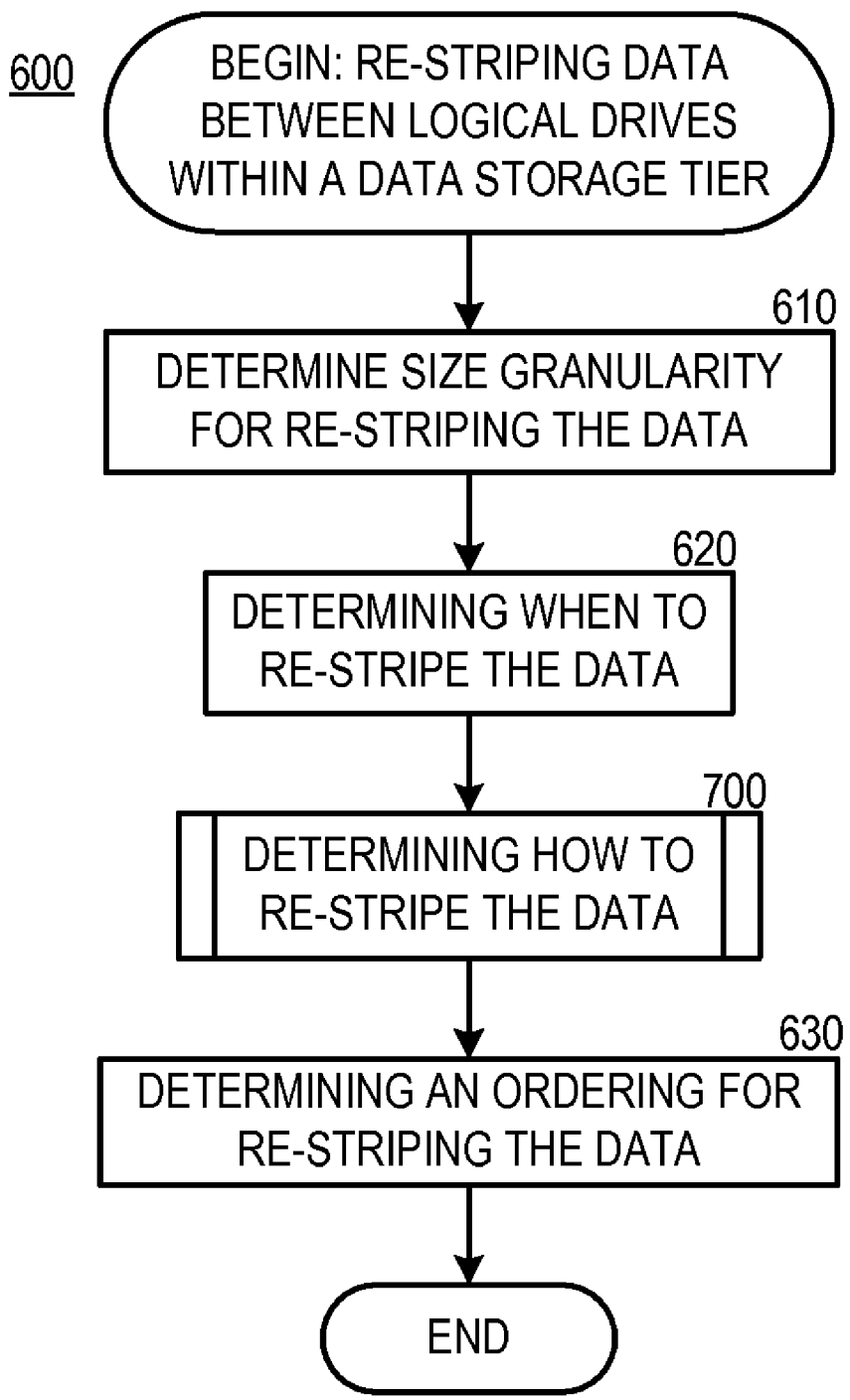
FIG. 6 is a logical flow diagram illustrating a process performed by a data storage system for re-striping data between logical drives within a data storage tier according to one exemplary embodiment.

Turning now to FIG. 6, additional details will be provided regarding the embodiments presented herein for implementing container space management in a data storage system. In particular, FIG. 6 is a flow diagram showing a routine 600 that illustrates aspects of an exemplary process performed by a storage system for re-striping data between logical drives within a data storage tier. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 600 can begin with operation 610 where a granularity size can be determined for re-striping data among the logical drives of the tier. The simplest solutions may be for the CSM to use a granularity size equal to the size of one territory for re-striped data. For example, a territory may be 8 MB in size. Of course, other granularity sized may be used as well. At operation 620 it can be determined when data re-striping may occur. There may be two times specified for beginning data migration or re-striping. Firstly, when a new logical drive is added to a container, re-striping may be immediately triggered. Secondly, periodic data migration tasks may be allocated within the storage system as a background workflow. Theoretically, the best time to process background operations may be when the normal operating load on the system is minimal. Background workflows may be allocated operating resources when the main data I/O load on the storage system is at its low points. This can reduce the competition between the normal data storage operations and background operations, such as data migration.

A storage resource management (SRM) module can operate periodically, for example every hour, to manage the allocation of background workflow to various modules or plug-ins of the storage system. For example, data migration modules may be periodically supplied with quotas offering each module an opportunity to move a determined number of territories. If a module is unable to make use of its allocated number of data migrations, the quota of other modules or plug-ins may be increased.

Historical system load data can be analyzed to estimate preferred times in the future for scheduling background workflow quotas. Data access statistics can be collected over the course of several days on an hourly granularity. Similar statistics may also be collected over the course of months or years on a weekly granularity. This data can be analyzed to predict the load in the next hour and thus determine how much background workflow can be accommodated in that same hour without excessively impacting the system performance.

It can be assumed that the load on the system may be a direct function of the load in the past. That is, the load for a future period can be predicted, in a statistical sense, by examining loads from the historical load data. More specifically, the system load may be a superposition of various periodic loads. These periodic loads may correspond to a particular human-centric periodicity. For example, over the course of a day, roughly periodic troughs and peaks in the load may be observed depending, for example, on when employees come to work and when they leave. Over the course of a week, periods of relaxed load such as nights and weekend may be observed. Over the course of a year, certain days may be holidays year after year and display low loading. In this manner, an expected system load can be predicted, or estimated, from cyclical patterns found in past system loads.

It could be assumed that natural cycles in load data usually occur at periodicities of hours, working shifts, days, weeks, and years. However, a the load prediction system may be more autonomous and robust if instead of preselecting such periodicities, the predominant periodicities of the data are mathematically determined from the actual collected data. The natural cycles, or predominant periodicities, of the data may be determined from the peaks in an autocorrelation of the data. Autocorrelation can be described as the correlation of a function to itself. As such, the autocorrelation function peaks at times when the function correlates the highest with itself, or when it may be the most self-similar. Put more simply, peaks in an autocorrelation of a function can identify cycles in the function where patterns may be, to some extent, repeated.

The prediction of future loads may be based on the historical loads sampled at natural periodicities such as day of the week, or hour of the day. Alternatively, predominant periodicities, in the historical load data, may be identified from the time intervals that correspond to peaks in an autocorrelation of the historical load data. Either way, the periodicities selected can provide the basis of a linear predictor of future system load.

Background workflow quotas can be provided for a given future period. The quotas can represent the maximum number of background operations that can be performed with reduced impact on primary I/O operations, such as initiator data access. A peak load can be detected for the system. Such a peak load can serve as a proxy for the practical maximum of operations supported by the system. The system load may be estimated using a linear predictor. A permitted background load can be calculated by subtracting the estimated load from the peak load. When the permitted load is determined in capacity per time units it can be converted to a number more specific to the resources being allocated. For example, a number of migrations per hour may be determined by factoring in the size of a territory and the fact that a migration requires a double access to both read and write the data to be migrated.

Operation 700 can determine how data should be re-striped. Operation 700 may be implemented as a subroutine 700. Additional details regarding the subroutine 700 are discussed with respect to FIG. 7. At operation 630, an ordering for re-striping the data can be determined. As discussed with respect to FIG. 5, the most frequently accessed territories may be migrated first. A signed ILM metric value that is maintained for each territory may be used to determine which data is the most frequently used. The routine 600 may terminate after operation 630.

Figure 7:
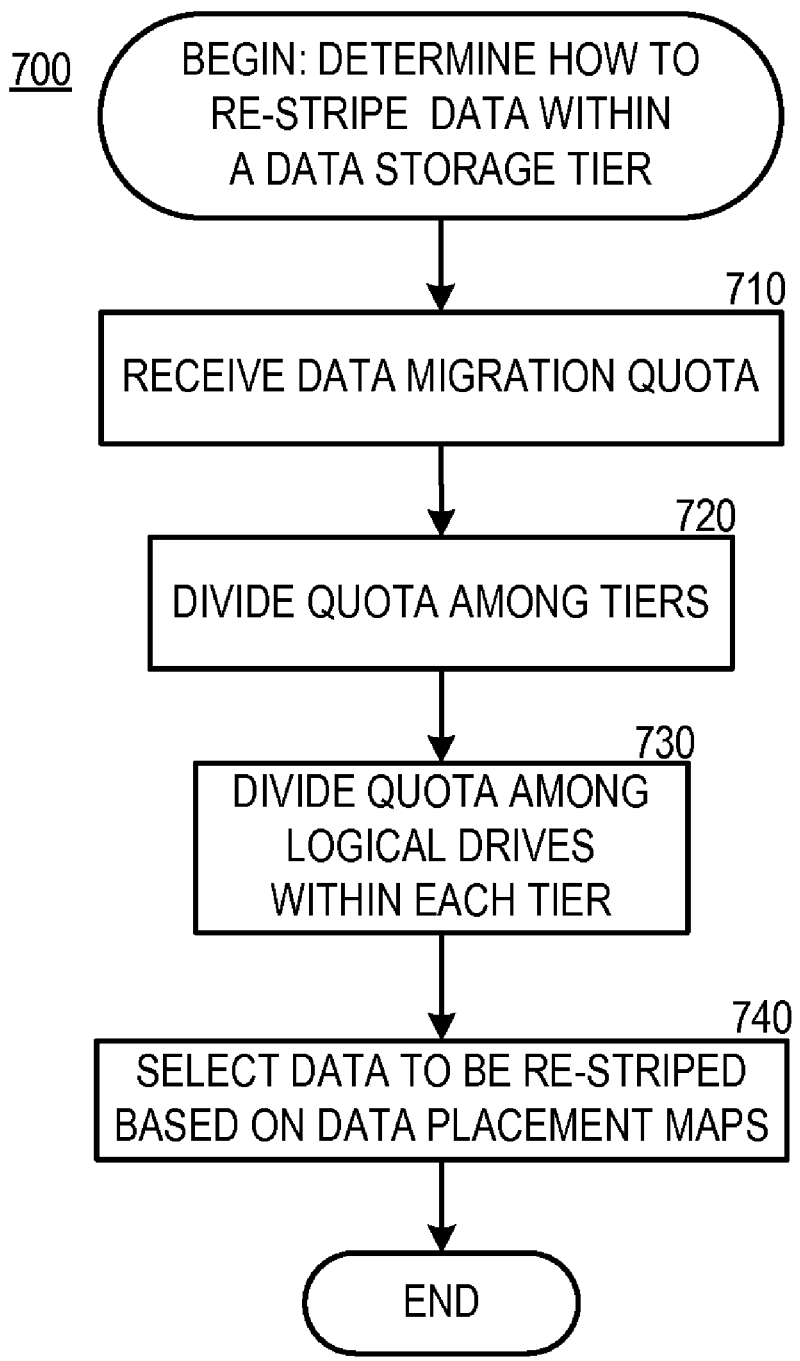
FIG. 7 is a logical flow diagram illustrating a process performed by a data storage system for determining how to re-stripe data within a data storage tier according to one exemplary embodiment.

Turning now to FIG. 7, additional details will be provided regarding the embodiments presented herein for implementing container space management in a data storage system. In particular, FIG. 7 is a flow diagram illustrating a routine 700 that shows aspects of an exemplary process performed by a storage system for determining how to re-stripe data within a data storage tier. The routine 700 can begin with operation 710 where a quota can be received for specifying the maximum number of data migrations that may occur. A workflow module can provide the data migration quota. The quota can be calculated based on a predicted I/O load to minimize impact on the servicing of I/Os from users or other applications.

At operation 720, the quota received in operation 710 may be divided among the tiers of the container 210. The division may be made according to the following relationship:

$$\text{quota(tier)} = \text{total\_quota} \times \left[\frac{\text{var(tier)}}{\text{total\_var}}\right]$$

Where the quota of each tier is given by the total quota obtained in operation 710 multiplied by the variance of the tier divided by the total variance of all tiers. Here variance is the statistical variance of the specific tier from the mean of all of the tiers. First the mean, often given by the Greek letter mu, or $\mu$, is determined by averaging the number of territories in all of the tiers. Such an average can be obtained by adding up all of the quantities and then dividing by the number of tiers. The variance of each tier can then be obtained by squaring the difference between the mean and actual quantity of territories within that tier. Thus, the variance may be given by:

$$\text{var(tier)} = (\mu - \text{quant(tier)})^2$$

At operation 730, the quota for each tier, as determined in operation 720, may be divided among the logical drives within that tier. A simple method may be to calculate the mean and then allocate the quota equally across the various logical drives. However, this may result in logical drives that require less of the quota actually being allocated a larger quota than required. Alternatively, a similar approach may be used to allocate the quota across the logical drives within the tier as was used to allocate the quota across the tiers. Thus, the division across the logical drives may be made according to the following relationship:

$$\text{quota}(LD) = \text{quota(tier)} \times \left[\frac{\text{var}(LD)}{\text{total\_var}}\right]$$

Where the quota of each logical drive is given by the tier quota obtained in operation 720 multiplied by the variance of the logical drive divided by the total variance of all logical drives within the tier. Here variance is the statistical variance in the number of territories within the specific logical drive from the mean of all of the logical drives. First the mean, often given by the Greek letter mu, or μ, is determined by averaging the number of territories in all of the logical drives. Such an average can be obtained by adding up all of the quantities and then dividing by the number of logical drives. The variance of each logical drive can then be obtained by squaring the difference between the mean and the actual quantity of territories within that logical drive. Thus, the variance may be given by:

$$\text{var}(LD) = (\mu - \text{quant}(LD))^2$$

At operation 740, the specific territories to be migrated from one logical drive to another may be selected. The DPA, as discussed with respect to FIG. 4 may be used here. The DPA can take into consideration three points when establishing the movement of territories between the logical drives. First, the DPA may seek to equalize the space utilization across all of the logical drives within the same tier. Second, the DPA may seek to re-stripe the data with the minimum possible number of data migration movements. Third, the DPA may seek to re-striping the data in an efficient manner so as to increase the total performance of the storage system. Data placement maps may be used to implement the DPA as discussed in additional detail with respect to FIG. 4. The routine 700 may terminate after operation 740.

Figure 8:
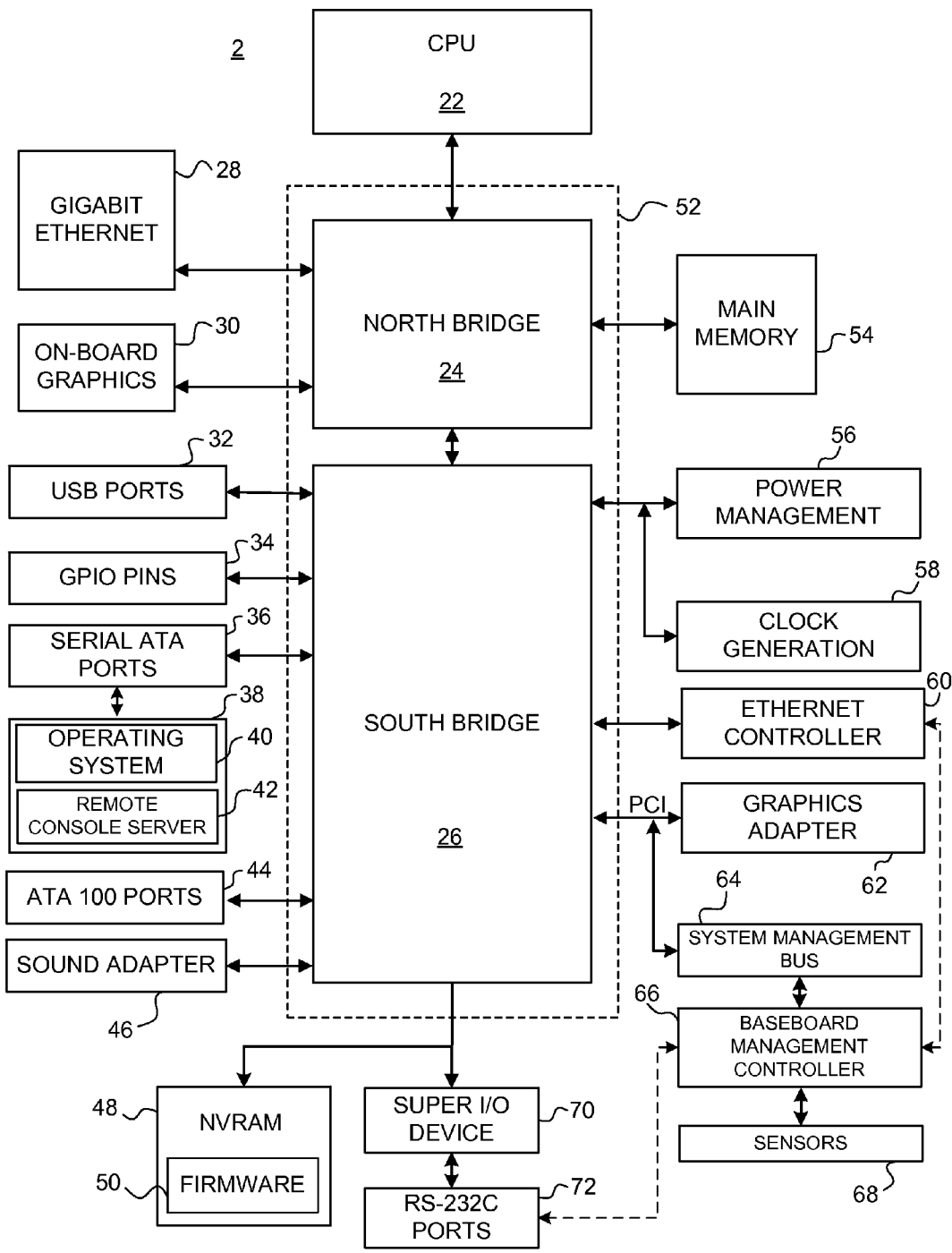
FIG. 8 is a computer architecture diagram illustrating a computer hardware architecture for a computing system capable of serving as a storage node according to one exemplary embodiment.

FIG. 8 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 8 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 8, may include other components that are not explicitly shown in FIG. 8, or may utilize an architecture completely different than that shown in FIG. 8.

Based on the foregoing, it should be appreciated that technologies for implementing container space management in a data storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for re-striping data between logical drives in a data storage container, the method comprising:
   partitioning the logical drives into a plurality of tiers where the logical drives within a common tier comprise a similar performance characteristic;
   storing a plurality of data placement maps that each define a stripe pattern for storing data in accordance with a number of logical drives;
   adding a new logical drive to the data storage container;
   determining a performance characteristic of the new logical drive;
   determining a tier of the plurality of tiers for the new logical drive based on the determined performance characteristic;
   determining to re-stripe data between the logical drives within the determined tier in response to the addition of the new logical drive;
   selecting which data to re-stripe between the logical drives within the determined tier in accordance with a data placement map from the plurality of data placement maps that corresponds to a new number of logical drives that includes the new logical drive; and
   imposing a preferred time ordering on the data selected to be re-striped.

2. The method of claim 1, further comprising determining to re-stripe data in response to receiving a periodic data migration indicator.

3. The method of claim 1, wherein selecting which data to re-stripe comprises establishing a maximum quota of data to migrate, dividing the maximum quota among the tiers as tier quotas, and dividing each tier quota among the logical drives within the respective tier.

4. The method of claim 1, wherein imposing a preferred time ordering comprises ordering data to be migrated earlier in response to the data having a higher access frequency.

5. The method of claim 1, wherein selecting which data to re-stripe comprises migrating data of a size granularity equal to a territory of the storage container.

6. A computer storage medium having computer-executable instructions stored thereon which, when executed by a computer system, cause the computer system to:
   partition a set of logical drives into a plurality of tiers where the logical drives within a common tier comprise a similar performance characteristic;
   store a plurality of data placement maps that each define a stripe pattern for storing data in accordance with a number of logical drives;
   add a new logical drive to the data storage container;
   determine a performance characteristic of the new logical drive;
   determine a tier of the plurality of tiers for the new logical drive based on the determined performance characteristic;
   determine to re-stripe data between the logical drives within the determined tier in response to the addition of the new logical drive;
   select which data to re-stripe between the logical drives within the determined tier in accordance with a data placement map from the plurality of data placement maps that corresponds to a new number of logical drives that includes the new logical drive; and
   impose a preferred time ordering on the data selected to be re-striped.

7. The computer storage medium of claim 6, further comprising determining to re-stripe data in response to receiving a periodic data migration indicator.

8. The computer storage medium of claim 6, wherein selecting which data to re-stripe comprises establishing a maximum quota of data to migrate, dividing the maximum quota among the tiers as tier quotas, and dividing each tier quota among the logical drives within the respective tier.

9. The computer storage medium of claim 6, wherein imposing a preferred time ordering comprises ordering data to be migrated earlier in response to the data having a higher access frequency.

10. The computer storage medium of claim 6, wherein selecting which data to re-stripe comprises migrating data of a size granularity equal to a territory of the storage container.

11. A data storage system comprising:
a storage subsystem;
a storage container associated with the storage subsystem;
a set of logical drives associated with the storage container; and
one or more container space management modules operable to cause the storage subsystem to:
partition the set of logical drives into a plurality of tiers where the logical drives within a common tier comprise a similar performance characteristic;
store a plurality of data placement maps that each define a stripe pattern for storing data in accordance with a number of logical drives;
add a new logical drive to the data storage container;
determine a performance characteristic of the new logical drive;
determine a tier of the plurality of tiers for the new logical drive based on the determined performance characteristic;
determine to re-stripe data between the logical drives within the determined tier in response to the addition of the new logical drive tier;
select which data to re-stripe between the logical drives within the determined tier in response to the addition of the new logical drive in accordance with a data placement map from the plurality of data placement maps that corresponds to a new number of logical drives that includes the new logical drive; and
impose a preferred time ordering on the data selected to be re-striped.

12. The data storage system of claim 11, further comprising determining to re-stripe data in response to receiving a periodic data migration indicator.

13. The data storage system of claim 11, wherein selecting which data to re-stripe comprises establishing a maximum quota of data to migrate, dividing the maximum quota among the tiers as tier quotas, and dividing each tier quota among the logical drives within the respective tier.

14. The data storage system of claim 11, wherein imposing a preferred time ordering comprises ordering data to be migrated earlier in response to the data having a higher access frequency.

* * * * *